Dec. 9, 1952     G. C. SEAVEY     2,620,766
GENERATION AND TRANSMISSION OF SOUND PULSES
Filed March 20, 1950     3 Sheets-Sheet 1

Inventor:
Gordon C. Seavey,
by William R. Hulbert, Jr.
Atty.

Dec. 9, 1952 G. C. SEAVEY 2,620,766
GENERATION AND TRANSMISSION OF SOUND PULSES
Filed March 20, 1950 3 Sheets-Sheet 3

Inventor:
Gordon C. Seavey, by William R. Hulbert, Jr.
Atty.

Patented Dec. 9, 1952

2,620,766

UNITED STATES PATENT OFFICE 2,620,766

GENERATION AND TRANSMISSION OF SOUND PULSES

Gordon C. Seavey, Arlington, Mass., assignor to Sonic Research Corporation, Boston, Mass., a corporation of Massachusetts Application March 20, 1950, Serial No. 150,567

11 Claims. (Cl. 116—137)

This invention relates to apparatus for generating and transmitting sound waves which, in one preferred application, are radiated into a specific earth region and undergo various reflection and refraction phenomena caused by subterranean structures and discontinuities of that earth region. The sonic waves are detected by receiving instrumentalities suitably distant from the radiant point, and thereafter analysis and correlation of factors, such as intensity and timing of the waves, leads to an interpretation of the nature of the subterranean discontinuities and constitutes a method of "seismic prospecting."

In conventional methods of seismic prospecting, difficulty is commonly experienced in generating sound waves of sufficient intensity, and also in maintaining a satisfactory basis for identifying and correctly evaluating the waves which are detected and received. Use of shock waves generated by detonating explosive materials is customary to secure increased intensities. However, explosive materials are subject to definite limitations in their use and the waves produced have irregular and unpredictable frequency characteristics lying in the low frequency range in which random ground noises are encountered with their undesirable masking effect.

The present invention is concerned with the problems indicated and generally aims to provide improved means for generating and radiating sound waves particularly useful in carrying out seismic prospecting of underground structures.

It is a further object of the invention to devise an improved apparatus for generating and transmitting sound waves of distinctive and readily identifiable frequency and intensity characteristics.

It is a feature of the present invention to provide an apparatus for transmitting a pulse consisting of a train of sound waves of controlled frequency into a medium through a surface thereof comprising a sound radiator adapted to vibrate at a predetermined frequency and having a portion adapted to engage said surface and a device for temporarily pressing said portion strongly against said surface so that during the intervals while the portion is so pressed, the coupling between said portion and said surface and the resultant transmission of sound waves into said medium will be greatly increased.

In a particular embodiment of the invention, used in seismic prospecting, the means for periodically pressing the vibrating body against the ground comprises a heavy weight which is permitted to fall by gravity against a cushioning spring mounted on top of the radiator, thus strongly pressing the ground engaging portion thereof against the earth by the impact of the falling weight thereby transmitting into the ground, for subsequent reflection, refraction and detection, one or more brief strong sonic pulses consisting of a train of high intensity sound waves of predetermined frequency.

These and other objects and novel features will be more fully understood and appreciated from the following description of a preferred embodiment of the invention selected for purposes of illustration and shown in the accompanying drawings, in which like numerals refer to like parts in the several views, and in which.

In accordance with the invention, sound waves are generated and are transmitted into the earth by delivering impacts to an externally driven, constant frequency vibrating sound radiator adapted to contact the earth's surface, with the result that there are produced very intense sharp pulses of sound distinguished by desirable frequency characteristics by which they are more easily detected and identified.

The principal parts of a preferred embodiment of the invention include a frame, a sound radiating member mounted in the frame in a position to be forced against a surface area of the earth, a driving mechanism for producing continuous oscillation of the sound radiating member, and a pulsing apparatus cooperating with the sound radiating member to produce sound pulses which may be directed into the earth.

It is contemplated that the combined structure may be designed of such form and weight as to permit its being moved about from one point to another and thus facilitate use specifically in carrying out seismic prospecting operations. It should be understood, however, that the invention is not limited entirely to this application but may be utilized in the communications field, as well as others.

Figure 1:
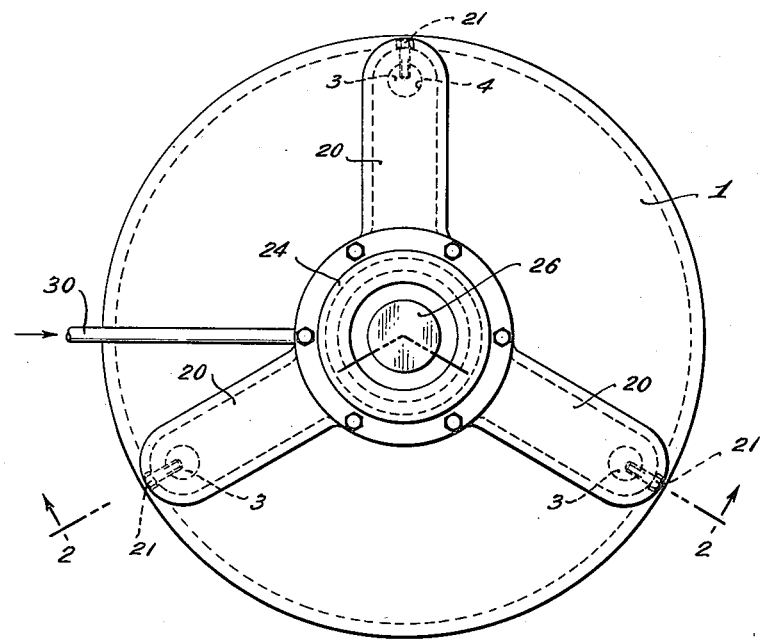
Fig. 1 is a plan view illustrating the sound generating and radiating apparatus for transmission of pulsed sound waves.
Figure 3:
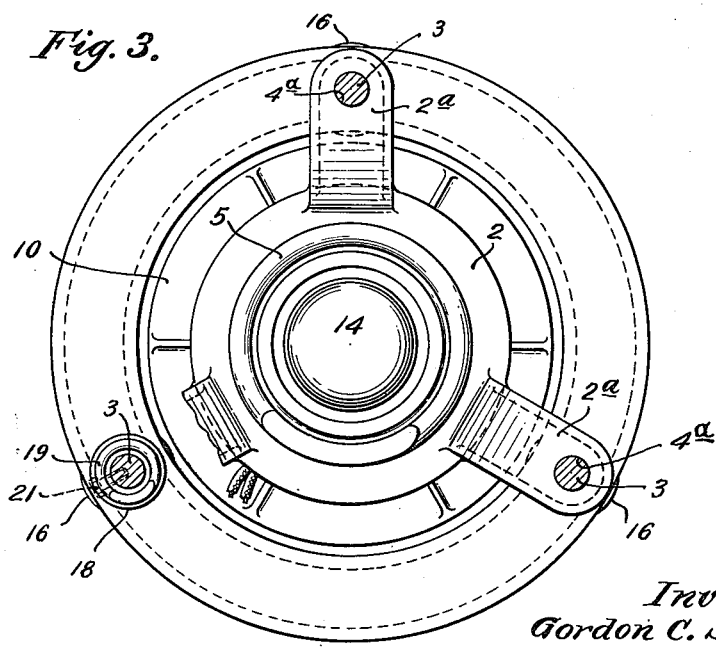
Fig. 3 is a plan cross-sectional view taken on the line 3—3 of Fig. 2.
Figure 2:
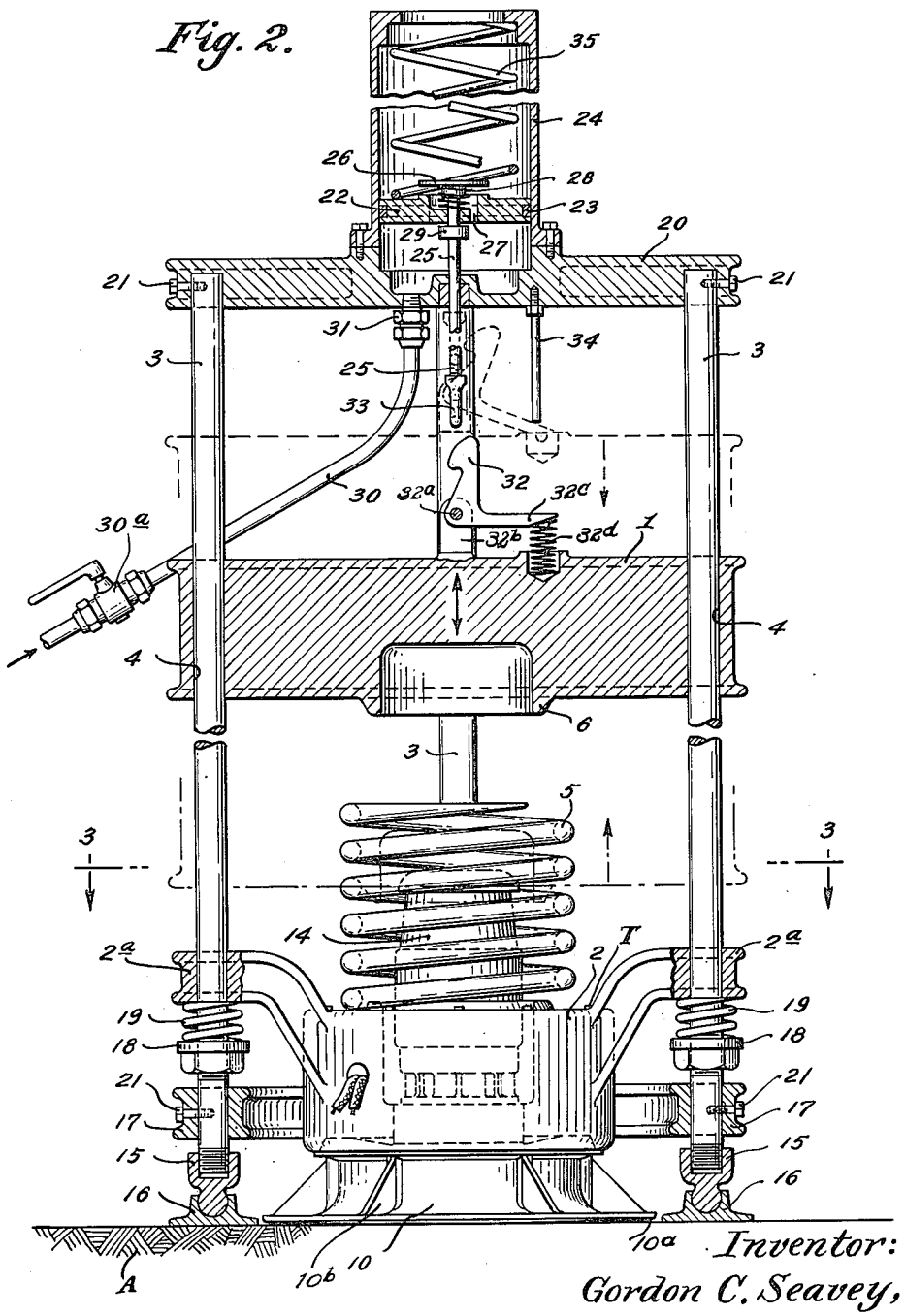
Fig. 2 is a vertical cross-section taken along the line 2—2 of Fig. 1 and illustrating sound generating portions of the apparatus in elevation.
Figure 4:
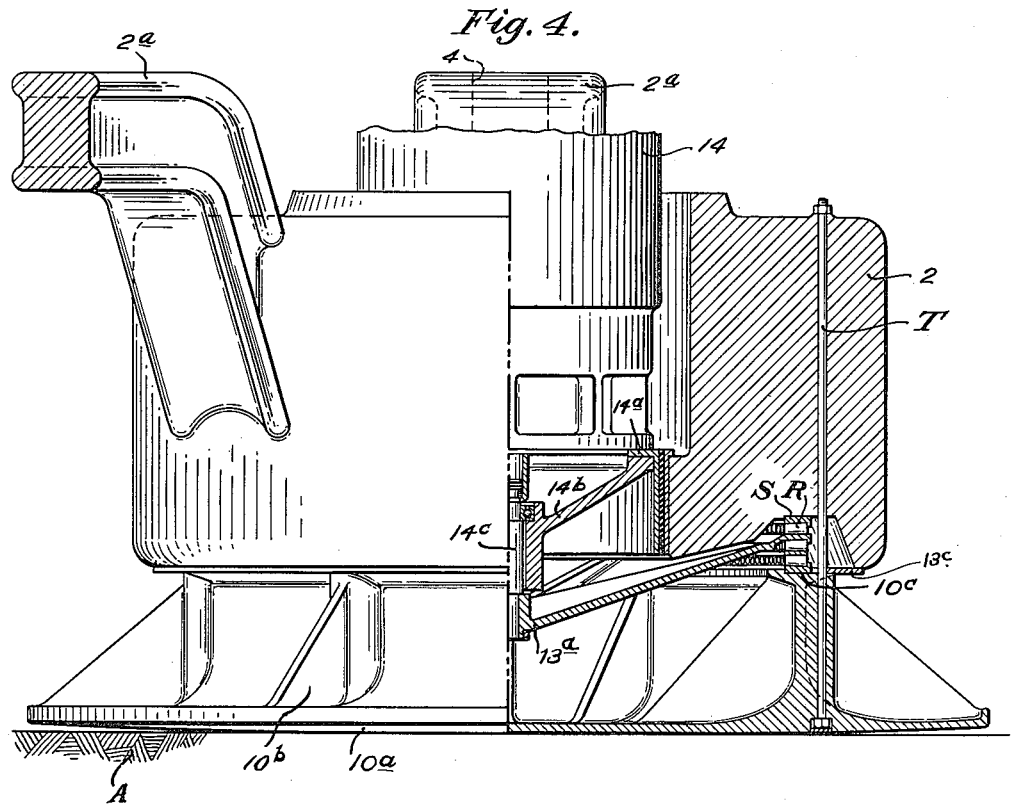
Fig. 4 is an elevation partly in section of the sound generating apparatus employed in the device of the invention.

In the structure shown in Figs. 2 and 4 of the drawings, the numeral 10 denotes the sound radiating member consisting of a vibrating body which is adapted to be strongly forced against a surface area A of the earth under impact and thus constitute a means of radiating sound into the earth. The member 10 is hereinafter referred to as the "sound radiator" or "radiator" and preferably is constructed with a substantially flat circular striking face 10a which is of rigid construction and reinforced by ribs 10b, as shown for example in Fig. 2. This high intensity sound radiator 10 may be one of several suitable types, for example that shown in U. S. Patent No. 2,558,089 or that of the co-pending application of the present applicant jointly with Caperton B. Horsley, Serial No. 179,711, filed August 16, 1950 (of common ownership with the present application). Other vibratory devices may be utilized, provided they are adapted to produce sound waves of sufficient intensity for my purposes. In the present application a specific generator of the type shown in the above referred to application, Serial No. 179,711, will be described although, as indicated, it is clear that the present invention is not limited thereto.

The radiator 10 is formed with a flat upper annular edge 10c upon which is supported a weight member 2 which may be conveniently referred to as "prime weight" 2. The size and shape of this prime weight 2 will be chosen with respect to desired operating conditions and also with reference to the type of sound radiation which is to be generated at different points along the surface of the earth where seismic prospecting operations may be desired to be carried out.

Figure 5:
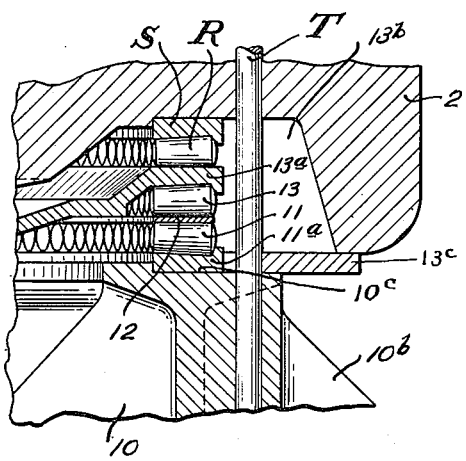
Fig. 5 is a fragmentary, detailed, cross-sectional view of the sound generating apparatus shown in Figs. 2 and 4.

Tension rods T are vertically disposed through the weight member 2 and extend downwardly into and through the sound radiator 10 rigidly securing this member against the under side of prime weight 2, as is more clearly illustrated in Fig. 4 of the drawings. Any suitable number of rods as, for example three, may be employed. A motor 14 is supported centrally in an opening in the weight member 2, as suggested in Fig. 4, on an annular bearing member 14a which is flexibly fitted into the bore of the weight member 2 and which includes a conical extension 14b for rotatably receiving therethrough the shaft 14c of the motor 14. The lower extremity of the shaft 14c is fast in a rotor member 13a which also is of substantially conical shape and has its outer peripheral portions extending upwardly, as illustrated in Figs. 4 and 5, into an annular recess 13b through which the tension rods T extend.

The recess 13b is closed at its bottom by a flexible annular sealing member 13c which permits motion of the weight 2 relative to the rest of the machine while preventing leakage.

Supported within the annular space 13b on the upper edge of the surface 10c is an annular stationary race member 11a. Located in spaced relation above this race member 11a is a thin annular shim 12 which separates a set of radially disposed conical shaped rollers 11 from a second upper set of similarly shaped rollers 13, as is more clearly indicated in Fig. 5. Arranged to rotate above and drive the set of rollers 13 is the movable annular rotor member 13a which, as noted above, is fast on the end of the motor shaft 14c. The member 13a is maintained in rotatable spaced relationship with the prime weight 2 by a series of tapered rollers R bearing on an annular race surface S.

Since the tension rods T hold the assembly compressively together, it will be apparent that as the rotating or movable race member 13a turns, in response to the drive of motor 14, both sets of rollers 11 and 13 will travel with respect to each other in such a manner that rollers of each row will approach rollers of an adjacent row slightly at those points of non-alignment of rollers of respective rows. This action is due to deflection of the thin shim 12, which flexes in response to the action of one of the upper rollers 13, for example, moving from a position directly above a roller of the lower row to a position opposite an interval between two of the lower rollers 11. As the roller then moves into its next position of alignment, the shim reverts from a distorted shape to a substantially straightened condition. The relative displacement of the rows of rollers thus occurring produces vibrations of the prime weight 2 and, by reaction, of the radiator 10. In this way sound waves are generated and are transmitted into the earth from the face 10a of the sound radiator when the latter is in contact with the earth's surface A.

The weight member 2 is adjustably supported in a vertical frame by means of a plurality of upwardly extending arms 2a which are formed with openings 4a to receive therethrough the vertical rods 3 of the frame. The lower extremities of the rods 3 are preferably threaded into a set of base members 15 having ball-shaped lower extremities which engage in sockets in the feet 16. A ring shaped member 17 is also provided for sliding movement on the rods 3 and is locked in place by set screws 21, as shown in Fig. 2, at points below the outer extremities of the arms 2a and in such relative position that the inner peripheral portions of the ring-shaped member 17 lie in spaced relation to the weight 2.

Portions of the vertical rods 3 occurring immediately above the ring-shaped member 17 are threaded to receive adjusting nuts 18 and the upper surfaces of these nuts 18 support compression type jack springs 19 which press against the under surfaces of arms 2a, as shown. By adjusting the positions of nuts 18, it is a simple matter to cause these jack springs 19 to carry a portion, or all, of the weight of the sound generating apparatus, as desired, and by so doing to modify the contact pressure of sound radiator 10 against the surface A of the earth.

The apparatus for producing sound pulses is shown at the upper portion of the device illustrated in Fig. 2, and includes a release and return mechanism for controlling movement of a weight member 1. The latter body is formed with openings 4 which are adapted to receive slidably therethrough the rods 3. Also included in the release and return mechanism is a spider 20 mounted over the tops of the rods 3 and fastened with bolts 21, as shown in Fig. 2. Supported in the spider 20 is a piston 22 received in a cylinder 24 and sealed by means of a ring 23. A rod 25 passes through the piston 22 and supports at its upper end of the cylinder a flat cover valve 26 which is adapted to close the upper end of the opening 27 formed in the piston against the action of the spring 28.

At its lower end the rod 25 is formed with a ring 33 which extends downwardly into an intermediate position between the spider 29 and the weight 1, as may be more clearly seen in Fig. 2. A hook 32 is pivotally mounted at 32a on a bracket 32b which is centrally located of the sliding weight 1. The hook 32 is formed with an angular arm extension 32c which projects radially outward to engage against a coiled spring 32d received in a slotted spring seat in the weight member 1, as suggested in Fig. 2. In alignment with the spring and extension 32c is a downwardly projecting stop member 34 secured to the under side of the spider 20 and adapted to release the hook 32 from the ring 33 when the weight member is raised on the rods 3, as suggested in dotted lines at the central upper portion of Fig. 2. Disengagement of the hook from the ring results in release of the weight member so that it may drop downwardly against the sound generating mechanism.

Located at the upper side of the sound generating mechanism in a position to receive the falling weight member 1 is a heavy coil spring 5 centrally disposed about the motor 14 and extending well above this member so that even a fully bottomed position of the weight 1, as indicated for example in broken lines in Fig. 2, the under surface of the weight will be held spaced from the top of the motor 14. To further guide the falling weight 1, there has been provided a tapering ring projection 6 extending from the under side of the weight member 1 and so designed as to engage within the opening defined by the coiled spring 5 when the weight bottoms.

In operation, the sliding weight 1 is raised to its initial held position, as shown in broken lines, by movement of the piston 22 which is forced upwardly in the cylinder 24 by compressed air admitted through a line 30, having a valve 30a. During this portion of the cycle of operation the valve cover 26 is held closed by the weight of member 1 suspended from the hook 32 in the ring 33. When the piston 22 has reached the limit of its vertical travel, the adjustable stud 34 is positioned to strike against the arm 32c of hook 32, thus releasing the latter member and allowing the weight 1 to fall. The piston is then returned to its bottom position by spring 35 and compressed gas is released through the opening 27, the valve cover being free to open to an extent defined by the collar 29, as soon as weight has been removed from rod 25. The gas then exhausts through the open top of cylinder 24.

It will be seen that the arrangement is so chosen that the ring 33 will be in its lowest position ready to be caught by the hook 32 as soon as moving weight 1 has rebounded from the sound generating mechanism under the action of cushioning spring 5. It will be obvious that the operation of the return and release mechanism may be made automatic at a predetermined frequency by adjusting the flow of compressed air through the line 30, or the sound pulses may be sent out individually by manual control, as desired.

In carrying out seismic prospecting in accordance with the invention, adjustment is first made of the ground coupling or relative positioning of the sound radiator 10. It will be seen that if the entire weight of the apparatus is borne by the radiator, the ground coupling or mean pressure of the radiator against the earth, and the intensity value of the continuously transmitted sound from the radiator, may be relatively high. As a consequence, the ground waves, i. e., those sound waves which travel close to the surface of the earth without penetrating it to any great extent, may be sufficiently intense to mask the relatively weak "deep layer" reflections which may be sought at the receiving point. If this is the case, the jack springs 19 may be adjusted to carry some of the weight of the apparatus so that the ground coupling is weaker and also so that the intensity value of the continuously emitted wave is lessened. It may even be desired, in some instances, to have all of the weight carried by the jack springs 19 so that the radiating member is substantially in spaced relation to the surface area A except under the impact of the weight 1 and no continuous wave radiation takes place.

To summarize the operation, the radiator 10 is caused to vibrate by the motion of the multiple rows of rollers, driven by the motor 14, and the moving weight 1 is then released and allowed to drop from its raised position downwardly against the cushioning spring 5. The force developed by the falling weight 1 is transmitted to the radiator 10 and causes this member, in turn, to be forced strongly against the surface area A for a short period of time determined by the values of the prime weight 2, the moving weight 1, and by the elastic constants of the various springs used in the apparatus. Intense sound waves are then radiated into the ground for the period of time during which close ground contact is maintained.

In some instances, it may be desirable to generate a single pulse of sound, and then to wait before the next pulse until all reflected signals have been detected at the receiving points. In these cases, the weight release and return mechanism would operate only once, and the flow of compressed gas would be closed off as soon as moving weight 1 had been caught up on hook 32, after rebound from the cushioning spring 5. With such an arrangement, it would be possible by appropriate manipulation of the return and release mechanism to send out pulses on any desired intermittent schedule.

The duration of the individual pulses, that is, the length of time for which intense sound waves are transmitted into the earth, may be changed most easily by altering the characteristics of the cushioning spring 5, and it is anticipated that in the field several such springs of differing strengths would be used for this purpose. In general, it will be desirable to employ tuned receivers in order to exclude those frequencies in the extraneous ground noise which do not lie in the vicinity of the transmitted frequency, thereby permitting greater sensitivity in the receiving equipment. However, the "band width" in the tuned receiver should not be much less than the reciprocal of the pulse duration; for example, if the pulse duration is .01 sec., the "band width" should be in the order of 100 cycles/sec. or more. On the other hand, the duration of the pulses should be sufficient for the radiation of several cycles but short enough to permit of distinction between reflections from closely spaced discontinuities.

In other cases it may be desirable to transmit pulses of sound which are repeated at frequent periodic intervals. In this method of operation, close coupling between the radiating member 10 and the ground could be established for any desired short interval of time by choosing an appropriate cushioning spring 5. These intervals of sound wave emission could then be repeated periodically by maintaining a steady flow of compressed gas into the weight release and return mechanism. Using this periodic method of operation of our apparatus, it is not only possible to repeat observations with great ease, but it is possible to time the generated sound pulses to achieve various desirable results. For example, one may choose the intervals between pulses so that reflected waves from a particular sub-surface layer are received only when there are no interfering ground waves. This technique would be of special value when it is desired to detect reflections from layers directly below the sound generating apparatus, using detection equipment located right next to it for convenience. Other advantages of this method will be readily apparent to those skilled in the art.

The chief advantage of the apparatus of the invention in seismic prospecting lies in the production of very intense sound waves of definite frequency content with equipment of relatively light weight. This arises from the fact that the mean pressure of the radiating surface against the ground, and therefore also the permissible radiated sound intensity, may be increased in a far more efficient and successful manner by imparting to the radiator the impulse of a falling weight, than by attempting to add great weight to the apparatus.

As an example, if the radiating surface is 40" in diameter and it is desired to radiate sound into the ground having ground intensity at the radiating surface of plus or minus 200 pounds per square inch, it would be necessary to provide a weight of approximately 120 tons in order to maintain contact of the radiating surface with the ground throughout the complete cycle of oscillation of this surface. By the use of the invention, however, the total required weight can be greatly decreased, since the dropping of a weight of approximately three tons through a 20-foot distance on a spring member that is moved ⅝ of an inch by the impact of this weight, will provide mean pressures on the radiating surface of more than 200 pounds per square inch for a period of approximately 1/30 of a second.

Because of the change in load on the driving means brought about by the addition of the moving weight during the interval of close coupling, the frequency transmitted into the ground may tend to be slightly lower than that generated by the radiating member before the moving weight is dropped. If this change is significant in a given instance, it may be readily overcome by supplying the driving means with overload compensation, such as an appropriate flywheel mechanism.

The elevating mechanism for the moving weight may be modified as by being actuated by hydraulic or steam-powered means or a motor-driven winch with a periodically engaging clutch. Also, the moving weight and its guides may be suspended from a separate portable derrick, if this should be convenient, and other changes made in keeping with the invention as defined by the appended claims.

Having thus described my invention, what I desire to claim as new is:

1. Apparatus for transmitting a pulse consisting of a train of sound waves of controlled frequency into the earth, comprising: a sound radiator adapted to vibrate at a predetermined frequency, a frame having yielding mountings supporting said radiator adjacent a selected area of the earth, a cushioning member mounted on said radiator, and a weight movably held in said frame above said cushioning member and arranged to be dropped thereon for temporarily pressing said radiator strongly against said area by the resultant impact for greatly increasing the coupling between said radiator and the earth and the resultant transmission of sound waves into the earth while said radiator is so pressed.

2. Apparatus according to claim 1 including a hoisting and releasing device for raising and dropping said weight.

3. Apparatus according to claim 1 in which said mountings are arranged to support said radiator out of engagement with the earth except during said impact.

4. Apparatus according to claim 1 in which said mountings are adjustable to vary the normal coupling between said radiator and the earth between impacts.

5. An apparatus for transmitting sound waves into the earth, comprising a frame, a sound radiator mounted for vertical movement in the frame, a supporting member constructed and arranged resiliently to suspend said radiator in spaced relation to a surface area of the earth, driving means for oscillating the radiator against the surface area to produce a series of sound waves, a weight slidably mounted for vertical movement in said frame above said radiator, a cushioning spring arranged on said radiator and positioned to receive the weight in its lower position, and mechanism for alternately raising and releasing the weight member to cause the sound waves to be pulsed by the impact of said weight striking said spring thereby strongly pressing said radiator against the earth.

6. Apparatus according to claim 5, in which the raising and releasing mechanism includes a pivoted latch, a ring member cooperating with the latch to hold the weight in a suspended position, and a piston and cylinder assembly operating to control the movement of the latch.

7. Apparatus according to claim 6 which includes gas operated means for moving the piston and valve means for controlling the flow of gas through the said piston and cylinder assembly.

8. An apparatus for transmitting sound wave pulses into the earth, comprising a frame, a sound radiating body, a supporting member adjustably secured to the frame and being solidly attached to said radiating body at the upper side thereof and in position to support the same adjacent a surface area of the earth, and mechanism for oscillating said radiating body, said mechanism including a plurality of rows of radially disposed rollers having a separating shim disposed therebetween, driving means for moving one of the rows of rollers relatively to the other, a weight adjustably positioned above the supporting member, and mechanism for alternately holding and releasing said weight for permitting the same to strike said supporting member to press said body strongly against the earth by the resultant impact thereof.

9. In apparatus for transmitting a pulse consisting of a train of sound waves of controlled frequency into the earth, the combination comprising a sound radiator adapted to vibrate at a predetermined frequency and having a portion adapted to engage a desired surface area of the earth and a device for temporarily pressing said portion strongly against said surface area thereby greatly increasing the coupling therebetween and the resultant transmission of sound waves into the earth while said portion is so pressed, said sound radiator comprising upper and lower race members having mutually facing roller receiving races, a row of rollers interposed between and compressively maintained by said members in said races, one of said race members being rotatable for causing rolling movement of said rollers and one of said races presenting to said rollers a continuous surface of periodically varying resiliency so that said members will approach and recede from one another as said rollers pass over areas of different resiliencies.

10. Apparatus according to claim 9 in which said device comprises a weight suspended above said radiator and a hoist and release mechanism for alternately raising and dropping said weight on said radiator.

11. Apparatus for transmitting a pulse consisting of a train of sound waves of controlled frequency into the earth, which comprises: a sound radiator adapted to vibrate at a predetermined frequency, said radiator having a sound radiating surface adapted to be placed adjacent a selected area of the earth, vibratory driving mechanism for vibrating said radiator at said frequency a cushioning member mounted on said radiator, and a weight and a device for releasably mounting the same above said cushioning member, said weight being arranged to be dropped on said cushioning member for temporarily pressing said sound radiating surface strongly against said area by the resultant impact thereby greatly increasing the coupling between said radiator and the earth and the resultant transmission of sound waves into the earth while said radiating surface is so pressed.

GORDON C. SEAVEY.

REFERENCES CITED

The following references are of record in the file of this patent:

UNITED STATES PATENTS

| Number | Name | Date |
| --- | --- | --- |
| 313,637 | Whitaker | Mar. 10, 1885 |
| 510,198 | Shaw | Dec. 5, 1893 |
| 1,477,568 | Lancaster | Dec. 18, 1923 |
| 1,743,358 | Koeningsberger | Jan. 14, 1930 |
| 1,790,080 | Stanton | Jan. 27, 1931 |
| 2,006,561 | Schorle | July 2, 1935 |
| 2,054,428 | Klocke | Sept. 15, 1936 |
| 2,087,811 | Patrick | July 20, 1937 |
| 2,203,140 | Green | June 4, 1940 |
| 2,281,751 | Cloud | May 5, 1942 |
| 2,320,248 | Shimek | May 25, 1943 |
| 2,364,209 | Green | Dec. 5, 1944 |
| 2,558,089 | Horsley | June 26, 1951 |